United States Patent
Niss et al.

(10) Patent No.: US 10,612,518 B2
(45) Date of Patent: Apr. 7, 2020

(54) METHOD AND DEVICE FOR OPERATING A WIND TURBINE

(71) Applicant: Nordex Energy GmbH, Hamburg (DE)

(72) Inventors: Michael Niss, Arden (DK); Valeri Buller, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 0 days.

(21) Appl. No.: 16/203,237

(22) Filed: Nov. 28, 2018

(65) Prior Publication Data
US 2019/0162165 A1 May 30, 2019

(30) Foreign Application Priority Data
Nov. 28, 2017 (EP) .................... 17204162

(51) Int. Cl.
*F03D 7/02* (2006.01)
*F03D 7/04* (2006.01)

(52) U.S. Cl.
CPC .......... *F03D 7/0276* (2013.01); *F03D 7/028* (2013.01); *F03D 7/0272* (2013.01); *F03D 7/046* (2013.01); *F03D 7/048* (2013.01); *F05B 2270/101* (2013.01); *F05B 2270/1011* (2013.01); *F05B 2270/1016* (2013.01); *F05B 2270/1032* (2013.01); *F05B 2270/1033* (2013.01); *F05B 2270/32* (2013.01); *F05B 2270/3201* (2013.01); *F05B 2270/327* (2013.01); *F05B 2270/328* (2013.01); *F05B 2270/335* (2013.01)

(58) Field of Classification Search
USPC .................................... 290/44, 55
See application file for complete search history.

(56) References Cited

U.S. PATENT DOCUMENTS

| | | | | |
|---|---|---|---|---|
| 7,317,260 B2 * | 1/2008 | Wilson | .................. | F03D 1/0608 290/44 |
| 7,420,289 B2 * | 9/2008 | Wang | ..................... | F03D 7/028 290/44 |
| 8,386,085 B2 * | 2/2013 | Schwarze | ................. | F03D 7/02 322/35 |
| 8,704,393 B2 * | 4/2014 | Perley | ................... | F03D 7/0272 290/44 |
| 8,851,043 B1 * | 10/2014 | Coney | ....................... | F02G 3/00 123/197.4 |
| 8,957,537 B2 * | 2/2015 | Guadayol Roig | ...... | F03D 7/022 290/44 |
| 9,190,944 B2 * | 11/2015 | Perley | ................... | F03D 7/0272 |

(Continued)

FOREIGN PATENT DOCUMENTS

WO 9709531 A1 3/1997
WO 2015074664 A1 5/2015

*Primary Examiner* — Pedro J Cuevas
(74) *Attorney, Agent, or Firm* — Walter Ottesen, P.A.

(57) ABSTRACT

A method for operating a wind turbine includes: determining a value of a wind speed of an incident air mass at the wind turbine; if the determined value of the wind speed is greater than a first threshold value for the wind speed: reducing a rotational speed of a rotor of the wind turbine, and maintaining or increasing a generator torque acting upon the rotor; if the determined value of the wind speed is greater than a second threshold value for the wind speed, the second threshold value being greater than the first threshold value: reducing the rotational speed of the rotor, and reducing the generator torque acting upon the rotor.

16 Claims, 4 Drawing Sheets

(56) References Cited

U.S. PATENT DOCUMENTS

| | | | | |
|---|---|---|---|---|
| 10,480,486 B2* | 11/2019 | Brodsgaard | | F03D 7/0224 |
| 2007/0216166 A1* | 9/2007 | Schubert | | F03D 7/0224 |
| | | | | 290/55 |
| 2010/0320761 A1* | 12/2010 | Schwarze | | F03D 7/02 |
| | | | | 290/44 |
| 2011/0229316 A1* | 9/2011 | Biagini | | F03D 9/007 |
| | | | | 415/207 |
| 2012/0076651 A1* | 3/2012 | Laurberg | | F03D 7/02 |
| | | | | 416/1 |
| 2014/0042745 A1* | 2/2014 | Perley | | F03D 7/0272 |
| | | | | 290/44 |
| 2014/0097618 A1* | 4/2014 | Guadayol Roig | | F03D 7/022 |
| | | | | 290/44 |
| 2014/0167416 A1* | 6/2014 | Perley | | F03D 7/0272 |
| | | | | 290/44 |
| 2014/0261288 A1* | 9/2014 | Coney | | F02G 3/00 |
| | | | | 123/197.1 |
| 2015/0233349 A1 | 8/2015 | Pericleous | | |
| 2015/0275860 A1* | 10/2015 | Carcangiu | | F03D 17/00 |
| | | | | 290/44 |
| 2015/0276786 A1* | 10/2015 | Zuo | | F03D 17/00 |
| | | | | 290/55 |
| 2015/0337806 A1* | 11/2015 | Damgaard | | F03D 7/047 |
| | | | | 700/287 |
| 2016/0305402 A1 | 10/2016 | Caponetti et al. | | |
| 2017/0234300 A1* | 8/2017 | Brodsgaard | | F03D 7/0224 |
| | | | | 416/1 |
| 2017/0241404 A1* | 8/2017 | Kristoffersen | | F03D 7/0224 |
| 2018/0034394 A1* | 2/2018 | Kakuya | | F03D 9/25 |
| 2018/0045180 A1 | 2/2018 | Beekmann et al. | | |
| 2018/0100487 A1* | 4/2018 | Yamamoto | | F03D 7/0224 |
| 2018/0112646 A1* | 4/2018 | Betran Palomas | | F03D 7/0224 |
| 2019/0219033 A1* | 7/2019 | Caponetti | | F03D 7/0204 |

* cited by examiner

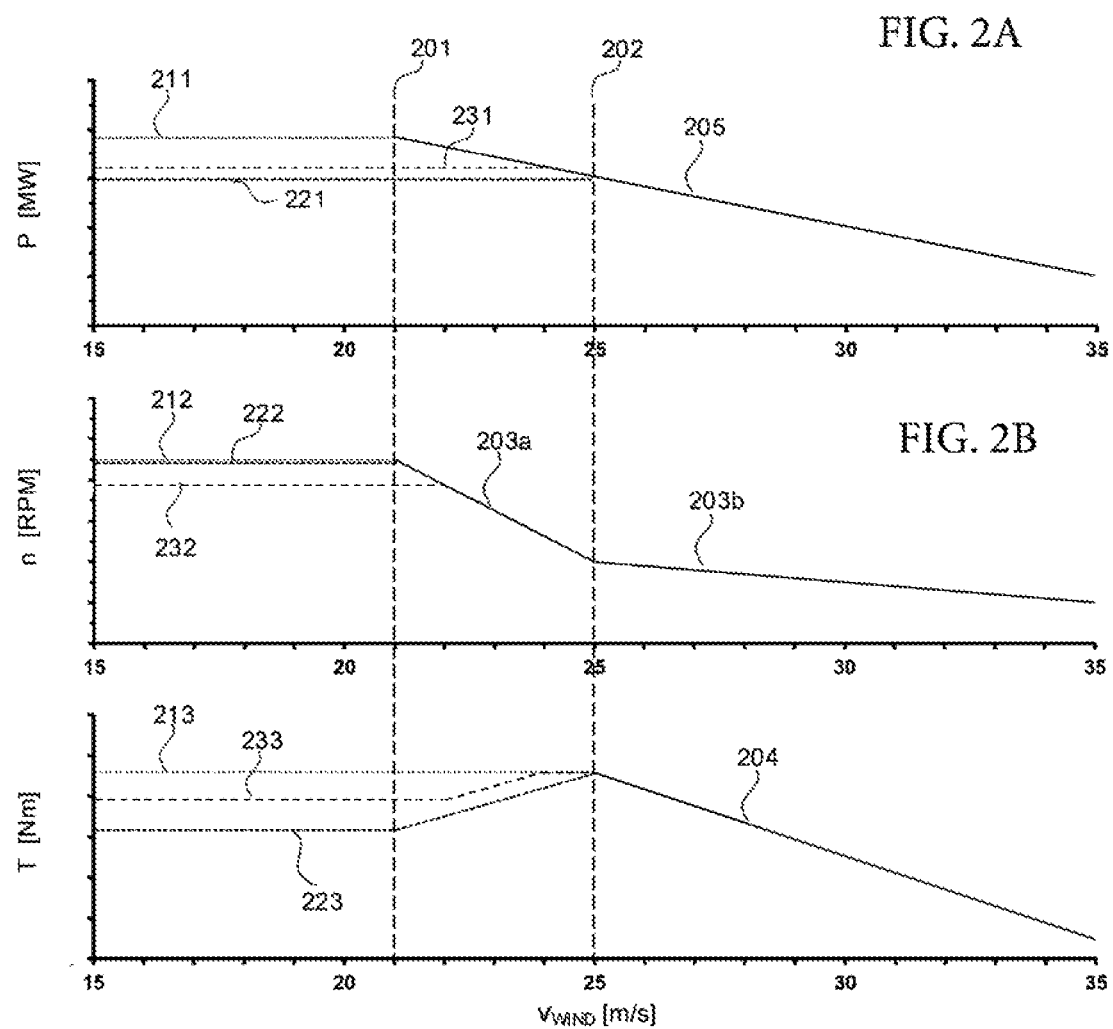

METHOD AND DEVICE FOR OPERATING A WIND TURBINE

CROSS REFERENCE TO RELATED APPLICATION

This application claims priority of European patent application no. 17204162.6, filed Nov. 28, 2017, the entire content of which is incorporated herein by reference.

FIELD OF THE INVENTION

The invention relates to a method for operating a wind turbine, in particular a variable-speed wind turbine, in the case of high wind speeds. The invention furthermore relates to a device for a wind turbine that is configured to perform the method, in particular for a variable-speed wind turbine.

BACKGROUND OF THE INVENTION

Wind turbines are used to convert the kinetic energy that is contained in the air flowing onto the rotor of the wind turbine into electrical energy. Present-day wind turbines are usually variable in speed, wherein the rotational speed of the rotor can be adjusted via the rotor blade pitch angle of at least one rotor blade of the rotor and via the generator torque of the generator of the wind turbine, acting on the rotor. Excessively high wind speeds can damage a wind turbine if its power output and rotational speed are not limited in good time. For this purpose, from a lower limit wind speed onwards, for example, the rotor blades are rotated such that the rotor of the wind turbine absorbs less power from the incident wind, and the rotational speed of the rotor is reduced. Above an upper limit wind speed, a load-free operating mode may be provided for a wind turbine, in which the rotor of the wind turbine can freely rotate at comparatively low rotational speeds without a generator torque acting on it, or the rotor of the wind turbine is moved into a parking position. In the load-free operating mode, the wind turbine does not convert any kinetic energy into electrical energy.

In order to increase the annual energy production of wind turbines, it is desirable to provide a method and a device for operating a wind turbine that enable reliable operation at a maximum power output with respect to the permissible operating loads, even in the case of high wind speeds.

WO 97/09531 A1 relates to a method for operating a wind turbine, in particular for limiting the loading on a wind turbine, preferably on a pitch-controlled wind turbine. The loading on the wind turbine is to be limited in the case of higher wind speeds. This is achieved by reducing the power output of the wind turbine depending on the wind speed, from a preset wind speed onwards, by reducing the rotational speed of the rotor of the wind turbine in case of occurrence of wind speeds above a limit wind speed.

US 2018/0045180 relates to a method for operating a wind turbine in which the rotational speed and the power output of the wind turbine are reduced if the prevailing wind speed exceeds a preset first limit value. The rotational speed and the power output are further reduced as the wind speed increases further, until the rotational speed attains a preset minimum rotational speed and/or the power output attains a preset minimum power output. These are maintained if the wind speed increases yet further.

From prior art various methods are known, in which, above a preset wind speed, the power output and the rotational speed of a wind turbine are reduced. Although the operating loads can thereby be reduced in an effective manner, maximizing of the annual energy yield is not achieved.

SUMMARY OF THE INVENTION

According to embodiments, this invention is characterized by a method and a corresponding device for operating a variable-speed wind turbine. The device is, for example a wind turbine closed-loop controller. The wind turbine has, for example, a generator, the generator torque of which, that is the torque of the generator, which acts upon the rotor of the wind turbine, can be set.

According to at least one embodiment, a value of a wind speed of an incident air mass is determined. For example, the wind speed of an air mass incident upon a rotor of the wind turbine is determined. If the determined value of the wind speed is greater than a first threshold value for the wind speed, a rotational speed of the rotor of the wind turbine is reduced. In addition, the generator torque acting upon the rotor is maintained or increased.

If the determined value of the wind speed is greater than a second threshold value for the wind speed, the rotational speed of the rotor is reduced, and the generator torque acting upon the rotor is reduced. The second threshold value is greater than the first threshold value.

The first threshold value for the wind speed specifies a first, comparatively high, wind speed, at which damage to the wind turbine caused by high loads occurring is avoided or reduced via a reduction of the rotational speed of the rotor. For example, the first threshold value is 21 m/s. However, operation at a reduced rotational speed is still possible; a changeover of the wind turbine to a load-free operating mode is not yet necessary. According to embodiments, the rotational speed is reduced continuously as wind speed increases, starting from a value before the attainment of the first threshold value, according to a first set limit rotational speed that is dependent on wind speed. According to further embodiments, a step-wise reduction is also possible. For example, reduction is effected partly continuously and partly step-wise.

In the reducing of the rotational speed, the generator torque is maintained in comparison with a generator torque that is present before the first threshold value is attained. Alternatively, the generator torque is increased in relation to a generator torque that was present before the first threshold value is attained. According to embodiments, a threshold value is set for the generator torque, up to which the generator torque is maximally increased.

Reducing of the rotational speed while simultaneously maintaining or increasing of the generator torque, enables the power output of the wind turbine to be reduced continuously with the wind speed. The rotational speed of the rotor can be reduced comparatively rapidly, in order to avoid damage. Due to the maintaining or, in particular, the increasing of the generator torque, the power output of the wind turbine is reduced, in dependence on the rotational speed, to a lesser extent than if a reduction of the generator torque was simultaneously effected. Thus, in, particular, a higher yield can be realized. In addition, grid requirements are more easily implemented.

If the wind speed increases further, and the second threshold value is attained, the rotational speed of the rotor is reduced further. The second threshold value is, for example, 25 m/s. Now, in addition, the generator torque acting upon the rotor is also reduced. The power output of the wind turbine is thus further reduced. According to embodiments, if the wind increases further the rotational speed of the rotor is reduced to the extent that the wind turbine can be operated safely with a reduced power output. For the further reduction of rotational speed, according to embodiments, above the second threshold value, a second limit rotational speed that is dependent on wind speed is set. Furthermore, according to embodiments, above the second threshold value, a generator torque limit that is dependent on wind speed is set. Thus, above the second threshold value, the wind turbine is reduced continuously in its power output in dependence on the wind speed. According to further embodiments, a stepwise reduction is also possible. For example, reduction is effected partly continuously and partly step-wise.

According to embodiments, the wind speed dependent limiting values above the first threshold value, or between the first and the second threshold value, and the wind speed dependent limit values above the second threshold value are set such that the resultant lowering of wind speed dependent power output has the same value relative to the wind speed between the first and the second threshold value and above the second threshold value. Above the second threshold value, for example in the case of a wind speed of 35 m/s, according to embodiments it is provided that the wind turbine changes over to a load-free operating mode.

The flow speed, or wind speed, is measured, for example, via an anemometer. Alternatively or additionally, the wind speed is measured via a Lidar system. Alternatively or additionally, wind speed is determined on the basis of other influencing variables and a model, for example via a so-called wind estimator function. The influencing variables are, for example, the rotational speed, a pitch angle of the rotor blades and/or the power output.

According to at least one further embodiment, the first threshold value is set in dependence on a power output of the wind turbine. The lower the power output at the point at which the first threshold value is attained, the higher is the first threshold value, for example. Alternatively or additionally, the first threshold value is preset for the wind turbine so as to correspond to an admissible maximum rotational speed for the wind turbine.

According to at least one embodiment, the second threshold value is set in dependence on a power output of the wind turbine. For example, the second threshold value is lower if the power output is higher. Alternatively or additionally, the second threshold value is preset for the wind turbine so as to correspond to an admissible maximum rotational speed and/or an admissible maximum generator torque.

According to at least one embodiment, the rotational speed of the rotor is reduced continuously with a first gradient if the determined value of the wind speed is between the first threshold value and the second threshold value. The gradient determines a slope for the reduction of the rotational speed. The gradient determines how the rotational speed reduces in dependence on the wind speed.

According to at least one embodiment, the rotational speed of the rotor is reduced continuously with a second gradient, the slope of the second gradient being less than a slope of the first gradient if the determined value of the wind speed is greater than the second threshold value. The second gradient differs from the first gradient, such that there is a different relationship between the change in rotational speed and the wind speed. In particular, upon the first threshold value being exceeded, up to the second threshold value, a rapid reduction of the rotational speed is provided. Upon the second threshold value being exceeded, the rotational speed is already reduced to such an extent that damage to the wind turbine is largely prevented. A slower reduction of the rotational speed is thus possible. This enables the wind turbine to be operated even in the case of comparatively high wind speeds, and thus at least a reduced power output even in the case of high wind speeds. In comparison with a changeover to a load-free operating mode, in which the power output reduces to zero, further operation of the wind turbine at a continued power output is thus possible.

According to at least one embodiment, the rotational speed of the rotor is increased, in a rotational speed range around a synchronous rotational speed of the wind turbine, if the determined value of the wind speed decreases, starting from a value greater than the second threshold value. For example, the rotational speed range around the synchronous rotational speed is preset to deviate by 2% to 5% from the synchronous rotational speed.

If the wind speed reduces when the rotational speed of the wind turbine is in a narrow rotational speed range below the synchronous rotational speed of the wind speed, then, for a further reduction in wind speed, for example, the rotational speed is first held constant and then increased, in particular increased in a step-wise manner. For example, an increase to a rotational speed above the synchronous rotational speed is effected. Outside the rotational speed range around the synchronous rotational speed of the wind turbine, the rotational speed is lowered or increased according to the previously described embodiments.

If the determined value of the wind speed increases, in the rotational speed range around the synchronous rotational speed, for example, the rotational speed is first held constant and thereafter lowered, for example in a step-wise manner, whereby the synchronous rotational speed of the wind turbine is being undershot.

The rotational speed exhibits at least portionally around the synchronous rotational speed of the wind turbine a behavior that is deviating from overall reduction behavior. For an increasing wind speed, the relationship between the rotational speed and the wind speed is different from a relationship between the rotational speed and the wind speed in the case of decreasing wind speeds. A so-called hysteresis is provided.

Consequently, in the alteration of the torque or alteration of the power output, particular properties of the wind turbine can be taken into consideration. In particular, it is possible for the power output or the rotor rotational speed to be held constant within preset ranges.

According to at least one embodiment, the generator torque of the rotor is increased if the determined value of the flow speed, starting from a value greater than the second threshold value, decreases in a rotational speed range around the synchronous rotational speed. For falling wind speeds, for example the generator torque is at first held constant or at first increased slightly and then held constant. The generator torque is subsequently lowered in a step-wise manner.

If the determined value of the wind speed increases, in the rotational speed range around the synchronous rotational speed, the generator torque of the wind turbine is for example at first lowered, such that the power output can also be lowered continuously with increasing wind speed in the rotational speed range around the synchronous rotational speed of the wind speed. The generator torque is then, for example, increased, in particular in a step-wise manner, such that the power output of the wind turbine does not vary suddenly upon the rotational speed being lowered in a step-wise manner to below the synchronous rotational speed.

The generator torque exhibits a response that, at least portionally around the synchronous rotational speed of the wind turbine, differs from the response outside the rotational speed range around the synchronous rotational speed, which is described, for example, in the preceding embodiments. The increasing of the rotational speed has a response that differs, at least portionally, from a response of the reducing.

As an alternative or in addition to the hysteresis in the case of the dependence of the rotational speed, a hysteresis is provided in the case of the dependence of the torque on the wind speed. For falling wind speeds, consequently, a sudden rise is provided for the power output of the wind turbine around the synchronous rotational speed of the wind turbine.

According to at least one embodiment, the wind speed is measured via an anemometer. The measured wind speed may additionally be corrected, via a transfer function, to a free wind speed without influencing by the rotor of the wind turbine. The stated threshold values and wind speed dependent limit values may thus be set in respect of a free wind speed or in respect of a measured wind speed influenced by the rotor of the wind turbine. Alternatively, the wind speed is measured via a LIDAR or SODAR system. Alternatively, the wind speed is determined on the basis of other influencing variables and a model, for example via a so-called wind estimator function. The influencing variables are, for example, the rotational speed, a pitch angle of the rotor blades and/or the power output.

According to at least one embodiment, a mean value of the values of the wind speed is determined in a preset time period, in order to ascertain the value of the wind speed. For example, the time period is 3 seconds long, 10 seconds long or 30 seconds long, or is of another length. Individual peak variations in the wind speed are thus filtered. In particular, the time period is set differently, for example in dependence on measured or anticipated turbulences of the wind speed.

According to at least one embodiment, the time period is set so as to be less, if the value of the wind speed increases, than if the value of the wind speed decreases. The value of the wind speed is thus filtered or averaged in an asymmetrical manner. In the case of an increasing wind, in particular, the shorter time period renders possible a more rapid reaction to variations in the wind speeds and the loads associated therewith. In the case of decreasing wind speeds, a longer time period renders possible, in particular, a more uniform power output.

BRIEF DESCRIPTION OF THE DRAWINGS

The invention will now be described with reference to the drawings wherein:

FIGS. 2A to 2C show schematic representations of responses of the power output, rotational speed and generator torque, according to an embodiment; and, FIGS. 3A to 3C show schematic representations of responses of the power output, rotational speed and generator torque in a rotational speed range around a synchronous rotational speed of the wind turbine, according to an embodiment.

DESCRIPTION OF THE PREFERRED
EMBODIMENTS OF THE INVENTION

Further advantages, features and developments are revealed by the following examples, explained in conjunction with the figures. In the latter, elements that are the same, of the same type or have the same function may be provided with the same references across all figures.

Figure 1A:
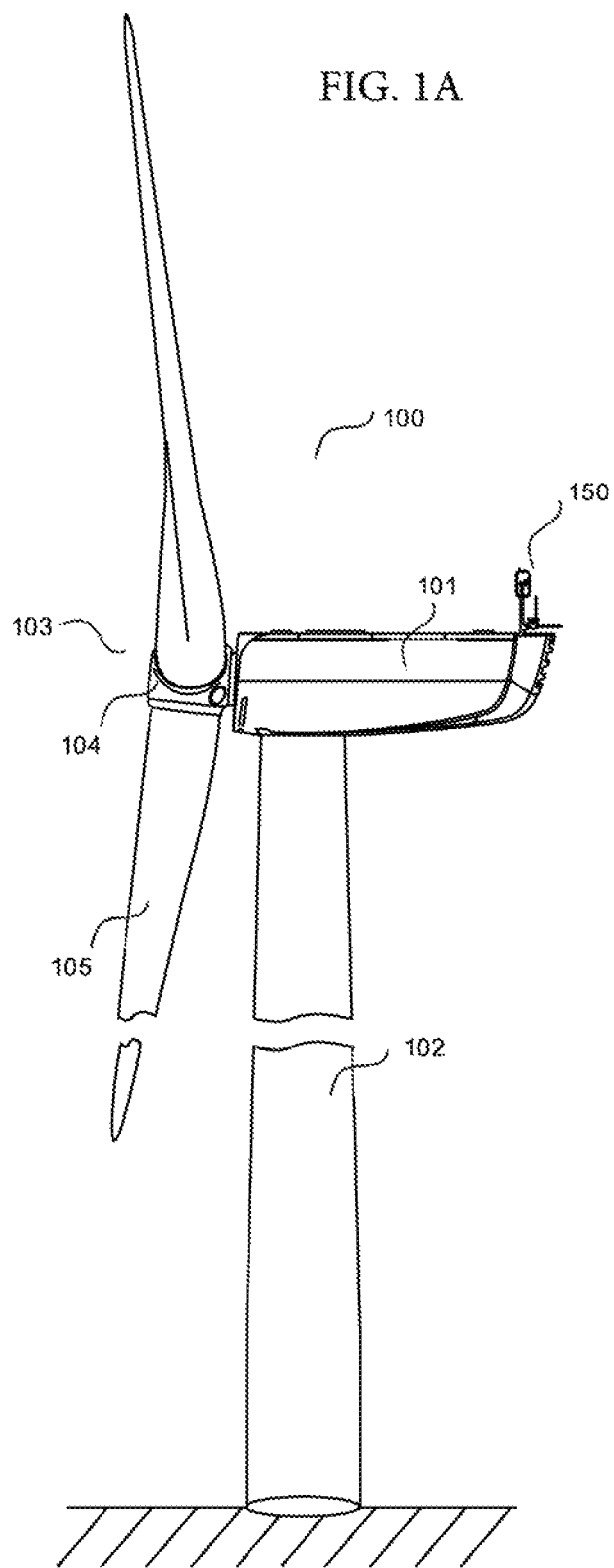
FIG. 1A shows a schematic representation of a wind turbine, according to an embodiment.
Figure 1B:
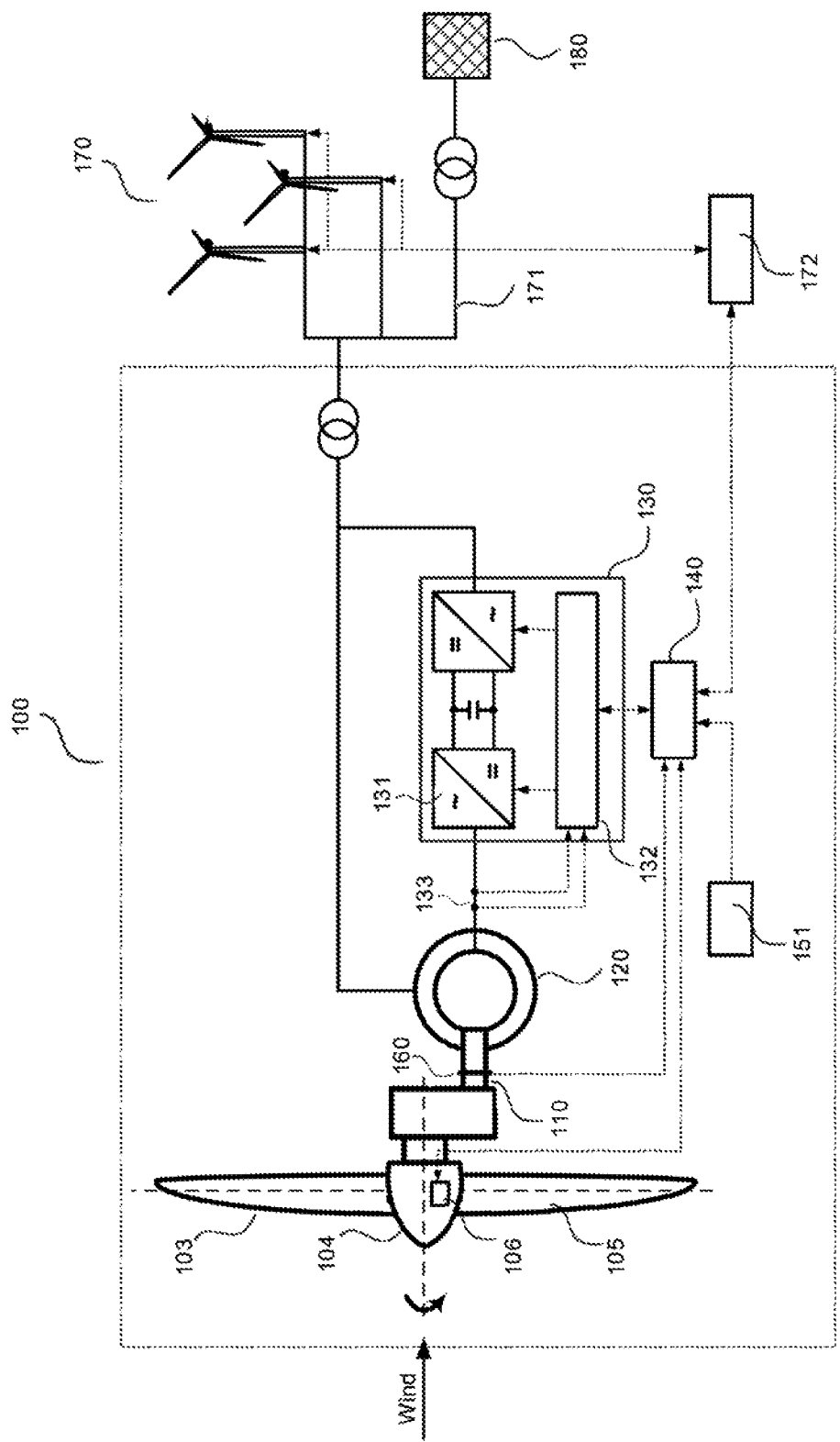
FIG. 1B shows a detailed schematic representation of the wind turbine from FIG. 1A, in a wind farm, according to an embodiment.

FIGS. 1A and 1B show a schematic representation of a wind turbine 100, according to an embodiment. The wind turbine 100 has a stand device 102, in particular a tower. A nacelle 101 is rotatably mounted at one end of the tower 102.

The nacelle 101 has a generator 120. The generator is coupled, for example via a drive train 110, to a rotor 103. The rotor 103 has one or more rotor blades 105, which are arranged on a rotor hub 104.

During operation, the rotor 103 is put into rotation by an air flow, for example wind. This rotational motion is transmitted, via the drive train, to a rotor (not shown) of the generator 120. The generator 120 converts the kinetic energy of the rotor 103 into electrical energy.

The wind turbine 100 additionally has a sensor array 150, arranged on the outside of the nacelle 101. An anemometer 151 is provided as part of the sensor array 150, in order to acquire a measurement value for the wind speed.

FIG. 1B shows a detailed schematic representation of the wind turbine according to the embodiment according to FIG. 1A, in a wind farm 170.

The wind turbine 100 is configured with a doubly-fed asynchronous generator as a generator 120. The stator (not shown) of the generator 120 is electrically connected to an electrical transmission grid 180. The rotor of the generator 120 is electrically connected to the electrical transmission grid 180 via a main converter 130. Further devices may be provided to connect the wind turbine to the electrical transmission grid 180. For example, the wind turbine 100 may be electrically connected, via a medium-voltage transformer, to a wind farm collector bus 171, which in turn is connected to the electrical distribution grid 180 via a high-voltage transformer. Via this electrical connection, the wind turbine feeds the power provided by the generator into the transmission grid. A wind farm closed-loop controller 172 is provided for primary closed-loop control of the power output of the wind turbine 100 and of further wind turbines in the wind farm 170.

A wind turbine closed-loop controller 140 is provided for controlling the wind turbine 100 by closed-loop control. For example, the wind turbine closed-loop controller 140 receives signals and control commands from the wind farm closed-loop controller 172, and for this purpose is connected to the latter for data communication. The wind turbine closed-loop controller 140 is additionally connected to a blade pitch controller 106, via which the wind turbine closed-loop controller 140 controls a pitch angle of the rotor blades 105.

The main converter 130 of the wind turbine 100 has a generator-side converter 131 and a converter closed-loop controller 132. The converter closed-loop controller 132 is configured to set a generator torque at the generator 120, via a closed-loop control of the rotor currents in the generator rotor. For this purpose, the converter closed-loop controller 132 sets regulating variables to the grid-side converter 131, for example for rotor currents, active and reactive power and/or generator torque. Corresponding closed-loop control methods are known from the prior art. The rotor-side converter 131 sets the rotor currents, and thereby the generator torque, for example by switching power electronic components. For the purpose of controlling the generator torque by closed-loop control, the converter closed-loop controller 132 is connected to the wind turbine closed-loop controller 140 for data communication, and receives from it a reference value for a generator torque or an active power to be delivered. Input variables required for the closed-loop control, such as rotor-circuit currents and rotor-circuit voltages, are acquired by a current/voltage sensor 133 and are present as a signal at the converter closed-loop controller 132.

The wind turbine 100 has a rotational speed sensor 160. The latter may be provided at any position on the drive train 110, for example on a gearbox output shaft, which is connected to the generator rotor of the generator 120. Rotational speed values measured by the rotational speed sensor 160 are present as an input variable at the wind turbine closed-loop controller 140.

In addition, the measurement values for the wind speed, measured by the anemometer 151, are present as input variables at the wind turbine closed-loop controller 140.

The wind turbine closed-loop controller 140 is configured to control the power output of the wind turbine and the rotational speed thereof by closed-loop control, and for this purpose is configured with a corresponding software. The closed-loop control of the power and rotational speed is effected according to the method known for variable-speed wind turbines, the power being linked to the rotor rotational speed, via the generator torque. The rotor rotational speed is set via the setting of the rotor blade pitch angle and the generator torque acting upon the drive train.

FIGS. 2A to 2C show a reduction of a rotational speed 212, 222, 232 of the rotor 103 in the case of increasing wind speed, that is, when the air flow at the wind turbine 100 increases.

In FIGS. 2A to 2C, the wind speed is plotted on the X axis in each case. Plotted on the Y axis in FIG. 2A is a power output, in FIG. 2B a rotational speed, and in FIG. 2C a generator torque.

A first threshold value 201 and a second threshold value 202 are set, for example, in dependence on the wind speed. For example, the first threshold value 201 lies at a wind speed of approximately 21 m/s. The first threshold value may also be higher or lower. For example, the second threshold value 202 lies at a wind speed of approximately 25 m/s. The second threshold value 202 may also be higher or lower. The second threshold value 202 is, in particular, higher than the first threshold value 201. The first threshold value 201 lies, in particular, at a wind speed at which, without intervention in the control of the wind turbine 100, damage to the wind turbine 100 would occur as a result of an increasing rotational speed 212, 222, 232 and/or an increasing generator torque 213, 223, 233. In the case of increasing wind speeds, a maximum power output 205 of the wind turbine 100 decreases from the first threshold value 201 onwards.

The wind turbine closed-loop controller 140 controls the wind turbine 100, in particular a pitch control system of the rotor blades 105, such that the rotational speed 212, 222, 232 deceases (FIG. 2B) if the measured wind speed rises above the first threshold value 201. Damage to the wind turbine 100 resulting from the high wind speed is thus avoided.

In particular, the rotational speed 212, 222, 232 decreases with a first preset gradient 203a. The rotational speed 212, 222, 232 may decrease continuously or in a step-wise manner, preset by the first gradient 203a. The first gradient 203a is preset, in particular, such that a rapid reduction of the rotational speed 212, 222, 232 is effected. As a result, damage is successfully avoided. In particular, the slope of the first gradient 203a is preset by the measured wind speed. The greater the increase in the wind speed, the greater is the slope of the gradient 203a, to enable a rapid reduction of the rotational speed. Alternatively, the first gradient 203a is fixedly preset and stored, for example, in the wind turbine closed-loop controller 140.

As wind speed increases beyond the first threshold value 201, the generator torque 233 is always held constant and then increased. Alternatively, following attainment of the first threshold value 201 in the case of increasing wind speed, the further generator torque 223 is increased continuously or in a step-wise manner. Upon attainment of the first threshold value 201 in the case of increasing wind speed, the generator torque 213, 223, 233 of the wind turbine 100 is not reduced, but held constant and/or increased.

Holding the generator torque 213, 223, 233 constant, or increasing the generator torque 213, 223, 233, renders possible a comparatively rapid reduction of the rotational speed 212, 222, 232 with a slight reduction in the power output 211, 221, 231 of the wind turbine 100. If no intervention were effected in the control of the generator torque 213, 223, 233, the power output 211, 221, 231 would drop considerably more rapidly than if the generator torque 213, 223, 233 is held constant or increased. The power output 211, 221, 231 is a product of the generator torque 213, 223, 233 and the angular velocity, that is, the rotational speed 212, 222, 232. Consequently, if there is a large drop in the rotational speed 212, 222, 232, raising the generator torque 213, 223, 233 renders possible a weaker reduction in the power output 211, 221, 231 than by the reduction of the rotational speed 212, 222, 232 alone.

If the wind speed increases further and attains the second threshold value 202, the generator torque 213, 223, 233 is also reduced in addition to the rotational speed 212, 222, 232. A maximum generator torque 204 is reduced from the second threshold value 202 onwards. At the instant of attainment of the second threshold value 202, the generator torque 213, 223, 233 thus, in particular, has a local maximum. The power output 211, 221, 231 is reduced by the reducing of the rotational speed 212, 222, 232 and the reducing of the generator torque 213, 223, 233, such that, upon further increase in the wind speed, cut-out can be effected at the least possible power output 211, 221, 231.

In the case of wind speeds above the second threshold value 202, the reduction of the rotational speed 212, 222, 232 has, for example, a second gradient 203b. The first gradient 203a and the second gradient 203b may also each be referred to as a wind speed dependent rotor speed index.

In particular, the second gradient 203b differs from the first gradient 203a. In particular, the slope of the second gradient 203b is less than the slope of the first gradient 203a. The second gradient 203b prescribes the reduction of the rotational speed 212, 222, 232, for example continuous or in a step-wise manner. The second gradient 203b is preset, for example, like the first gradient 203a, and stored in the wind turbine controller 140. Alternatively or additionally, the second gradient 203b is preset differently in dependence on the prevailing wind speeds at the wind turbine 100.

The flatter slope of the second gradient 203b in comparison with the first gradient 203a is enabled because the rotational speed 212, 222, 232 has already been lowered, in the region between the first threshold value 201 and the second threshold value 202, to such an extent that damage to the wind turbine 100 can be avoided as far as possible, even in the case of high wind speeds. The rotational speed 212, 222, 232 needs thus only to be reduced to a lesser extent. Thus, operation of the wind turbine 100 with comparatively little change in the power output 211, 221, 231 is possible even in the case of high wind speeds and further increasing wind speeds.

A comparatively high power output 211, 221, 231 is possible when the wind turbine 100 is in the reduced operating mode because of the high wind speeds, since the generator torque 213, 223, 233 is controlled by the wind turbine controller 140. A sudden, complete shutdown of the wind turbine 100 can thus be avoided. Grid requirements of the operator of the utility grid to which the wind turbine 100 is connected can be realized in the case of high wind speeds. In particular, situations are avoided in which, owing to an emergency shutdown of the wind turbine 100, the nominal output is at once removed entirely from the grid within a very short time period.

Owing to the comparatively slow decrease in the power output 211, 221, 231 between the first threshold value 201 and the second threshold value 202, it is possible, in particular, to set the first threshold value 201 comparatively low. Even in the case of the first threshold value 201 being exceeded, a sufficient power output 211, 221, 231 is achieved, since the generator torque 213, 223, 233 remains the same or is increased. The wind turbine 100 is thus protected further.

Above the first threshold value 201, the rotational speed 212, 222, 232 and the generator torque 213, 223, 233 are actively controlled by the wind turbine closed-loop controller 140, while the power output 211, 221, 231 is reduced. At first the power output 211, 221, 231 is reduced slightly, in that the rotational speed 212, 222, 232 is reduced greatly, but the generator torque 213, 223, 233 is held constant or is increased. In particular, the generator torque 213, 223, 233 is increased with a predefined maximum value.

Following attainment of the second threshold value 202, the power output 211, 221, 231 is further reduced by a further reduction of the generator torque 213, 223, 233. In particular, the reduction of the rotational speed 212, 222, 232 and/or the reduction of the generator torque 213, 223, 233 is in each case dependent on the speed of the flow.

The speed of the flow is measured, for example, via the anemometer 151. Alternatively or additionally, other sensors may be provided, such as, for example, a Lidar system. Alternatively or additionally, the speed of the flow is determined on the basis of operating parameters of the wind turbine 100, for example on the basis of the rotational speed 212, 222, 232, a pitch angle of the rotor blades 105 and/or the power output 211, 221, 231.

The speed of the flow is determined, for example, with filtering, or an average value is assumed, for example over a time period of 3 seconds, 10 seconds or 30 seconds. For example, a low-pass filter is provided. The filter or the average is preset, for example, in dependence on measured or anticipated turbulences of the flow. In the case of lesser turbulences, the time period for the averaging is, for example, longer than in the case of strong anticipated turbulences.

For example, the filter and/or the averaging is different for increasing speeds of the flow, in comparison with decreasing speeds of the flow. In the case of increasing speeds of the flow, for example a comparatively short time period is preset, for example 10 seconds. A comparatively rapid reaction to the increase in the speed of the flow is thus possible. An adequate output reduction is thus possible. If the speed of the flow decreases again, for example a comparatively long time period is preset, for example 3 minutes, in order to hold the power output 211, 221, 231 comparatively constant, which is, for example, a grid requirement.

According to embodiments, the first threshold value 201 and the second threshold value 202 are each fixedly preset, for example in dependence on the configuration of the wind turbine 100. According to further embodiments, the two threshold values 201, 202 are set in dependence on the power output 211, 221, 231. For example, the first threshold value 201 and the second threshold value 202, in the case of a constant wind speed, are lower if the power output 211, 221, 231 is lower.

Figure 3A:
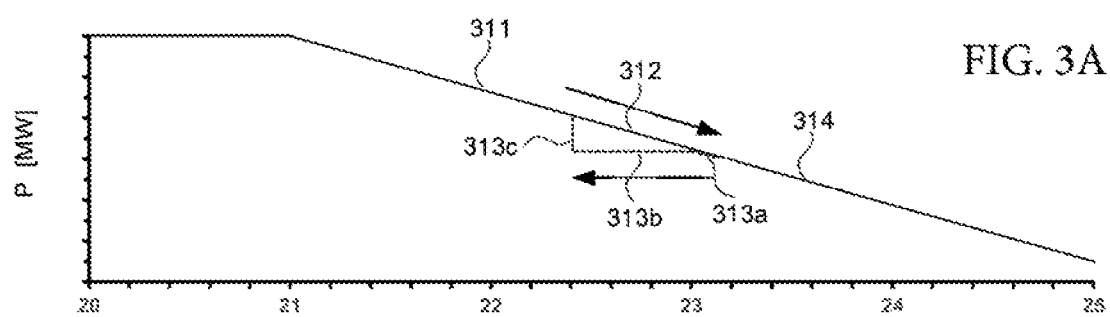
Figure 3B:
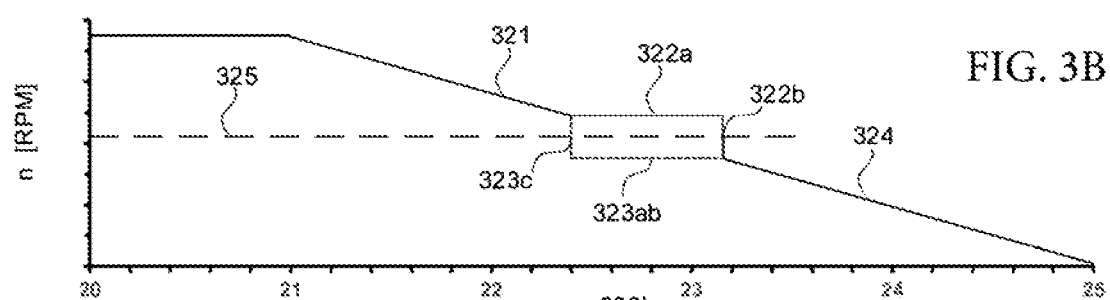
Figure 3C:
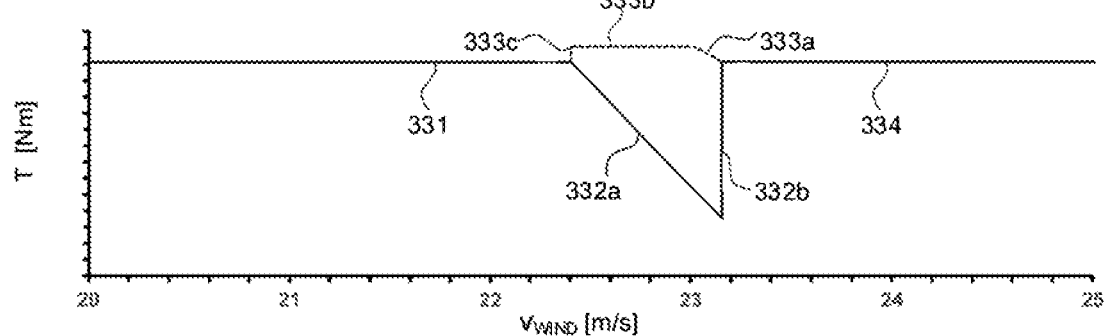

As is represented in FIGS. 3A to 3C, it is possible to realize a response 312 of the reduction of the power output in the case of increasing wind speeds that differs from a response 313a, 313b, 313c of the power output in the case of decreasing wind speeds. A hysteresis closed-loop control is provided. In particular, the method according to FIGS. 3A to 3C is used in a rotational speed range around a synchronous rotational speed 325 of the wind turbine. For example, the method as represented in FIGS. 3A to 3C is used if the rotational speed of the wind turbine 100 attains an upper limiting value that is slightly above the synchronous rotational speed 325 of the wind turbine 100.

In FIGS. 3A to 3C, the wind speed is plotted on the X axis in each case. Plotted on the Y axis in FIG. 3A is a power output, in FIG. 3B a rotational speed, and in FIG. 3C a generator torque.

For example, the rotational speed is reduced such that a response 322a, 322b of the rotational speed occurs that differs from a response 323ab, 323c of the rotational speed in the case of decreasing wind speeds. Correspondingly, a response 332a, 332b of the generator torque in the case of increasing wind speeds differs from a response 333a, 333b, 333c in the case of decreasing wind speeds. By the raising of the generator torque with reduced rotational speed, it is possible to hold the power output constant for a certain time period (characteristic 333b). The rotational speed reduction is thus performed in priority, irrespective of external prescriptions for the wind turbine 100.

In particular, the first sub-portion 322a of the rotational speed of the rotor 103 lies in a narrow rotational speed range around a synchronous rotational speed 325 of the wind turbine 100. In the first sub-portion 322a, the rotational speed is held constant, even if the determined value of the wind speed increases.

In the case of a further increase in the wind speed, a step-wise lowering of the rotational speed is effected in a second sub-portion 322b, the synchronous rotational speed 325 of the wind turbine being undershot.

The dependence of the rotational speed on the wind speed is different for an increasing wind speed than a dependence of the rotational speed on the wind speed in the case of decreasing wind speeds. A so-called hysteresis is provided. If the wind speed drops when the rotational speed of the wind turbine is in a narrow rotational speed range below the synchronous rotational speed 325 of the wind turbine, for further falling wind speeds the rotational speed is held constant, in a third sub-portion 323ab, before it is increased in a step-wise manner in a fourth sub-portion 323c, the increase being effected to a rotational speed above the synchronous rotational speed 325. Outside the narrow rotational speed range around the synchronous rotational speed 325 of the wind turbine 100, thus for example in the portions 321 and 324, the rotational speed is lowered or increased according to the previously described embodiments.

According to this embodiment, the generator torque is lowered in a first sub-portion 332a, such that the power output 312 can also be lowered continuously with increasing wind speed, in the rotational speed range 332a around the synchronous rotational speed 325 of the wind turbine. In a second sub-portion 332b, the generator torque of the wind turbine is increased in a step-wise manner, such that the power output 311, 312, 314 of the wind turbine 100 does not vary suddenly upon the rotational speed being lowered 322*b* in a step-wise manner to below the synchronous rotational speed 325.

For falling wind speeds, the generator torque is at first increased slightly, in a third range 333*a*, and then held constant 333*b*. Alternatively, the increase 333*a* is omitted and the generator torque is held constant.

In a fourth range 333*c*, the generator torque is reduced in a step-wise manner. The response of the generator torque has a response 332*a*, 332*b*, 333*a*, 333*b*, 333*c* that, at least portionally around the synchronous rotational speed 325 of the wind turbine 100, differs from the response 204, 213, 223, 223 as represented in FIG. 2. For falling wind speeds, consequently, a sudden rise is provided for the power 313*a*, 313*b*, 313*c* of the wind turbine 100 around the synchronous rotational speed 325 of the wind turbine 100.

Outside the narrow rotational speed range around the synchronous rotational speed 325 of the wind turbine 100, that is, for example in the portions 331 and 334, the generator torque is held constant.

The method according to the disclosure renders possible a rapid reduction of the rotational speed 212, 222, 232 in the case of increasing speeds of the flow, and thus a rapid reduction of the loads acting on the wind turbine 100. The generator torque 213, 223, 233 is reduced only subsequently. A rapid reduction of the loadings for the wind turbine 100, with comparatively slower reduction of the power output 205, or with power output 205 held constant for a time, is thus possible.

It is understood that the foregoing description is that of the preferred embodiments of the invention and that various changes and modifications may be made thereto without departing from the spirit and scope of the invention as defined in the appended claims.

REFERENCES 100 wind turbine
101 nacelle
102 stand device
103 rotor
104 rotor hub
105 rotor blade
106 blade pitch controller
110 drive train
120 generator
130 main converter
131 generator-side converter
132 converter closed-loop controller
133 current/voltage sensor
140 wind turbine closed-loop controller
150 sensor array
151 anemometer
160 rotational speed sensor
170 wind farm
171 medium-voltage collector bus
172 wind park closed-loop controller
180 electrical transmission grid
201 first threshold value for the wind speed
202 second threshold value for the wind speed
203*a* wind speed dependent rotor speed index
203*b* wind speed dependent rotor speed index
204 characteristic for the generator torque
205 response of the power
211 response of the power
212 characteristic for the rotor rotational speed
213 characteristic for the generator torque
221 response of the power
222 characteristic for the rotor rotational speed
223 characteristic for the generator torque
231 response of the power
232 characteristic for the rotor rotational speed
233 characteristic for the generator torque
311 response of the power outside the hysteresis range
312 response of the power in the first and second range
313*a* response of the power in the third range
313*b* response of the power in the third range
313*c* response of the power in the fourth range
314 response of the power outside the hysteresis range
321 wind speed dependent rotor speed limiting value outside the hysteresis range
322*a* rotational speed characteristic in the first sub-range
322*b* rotational speed characteristic in the second sub-range
323*ab* rotational speed characteristic in the third sub-range
323*c* rotational speed characteristic in the fourth sub-range
324 wind-speed dependent rotor speed limiting value outside the hysteresis range
325 synchronous rotational speed
331 response of the generator torque outside the hysteresis range
332*a* generator torque characteristic in the first range
332*b* generator torque characteristic in the second range
333*a* generator torque characteristic in the third range
333*b* generator torque characteristic in the third range
333*c* generator torque characteristic in the fourth range
334 response of the generator torque outside the hysteresis range

What is claimed is:

1. A method for operating a wind turbine having a rotor, the method comprising the steps of:
   determining a value of a wind speed of an incident air mass at the wind turbine;
   if the determined value of the wind speed is greater than a first threshold value for the wind speed:
      reducing a rotational speed of the rotor of the wind turbine, and
      maintaining or increasing a generator torque acting upon the rotor;
   if the determined value of the wind speed is greater than a second threshold value for the wind speed, the second threshold value being greater than the first threshold value:
      reducing the rotational speed of the rotor, and
      reducing the generator torque acting upon the rotor.

2. The method of claim 1 further comprising the step of setting the first threshold value in dependence upon a power output of the wind turbine.

3. The method of claim 2, wherein the first threshold value is set so as to be lower if the power output is higher.

4. The method of claim 1 further comprising the step of setting the second threshold value in dependence upon a power output of the wind turbine.

5. The method of claim 4, wherein the second threshold value is set so as to be lower if the power output is higher.

6. The method of claim 1 further comprising:
   if the determined value of the wind speed lies between the first threshold value and the second threshold value:
      continuously reducing the rotational speed of the rotor with a first gradient.

7. The method of claim 6, wherein the first gradient has a first slope, the method further comprising:
   if the determined value of the wind speed is greater than the second threshold value:

continuously reducing the rotational speed of the rotor with a second gradient, the second gradient having a second slope which is less than the first slope of the first gradient.

8. The method of claim 6 further comprising setting the first gradient in dependence upon the determined wind speed.

9. The method of claim 7 further comprising setting at least one of the first gradient and the second gradient in dependence upon the determined wind speed.

10. The method of claim 1 further comprising:
if, in a rotational speed range around a synchronous rotational speed of the wind turbine, the determined value of the wind speed decreases, starting from a value greater than the second threshold value:
increasing the rotational speed of the rotor, the increasing operation having a response that differs, at least in sections, from a response of the reducing operation.

11. The method of claim 1 further comprising:
if, in a rotational speed range around a synchronous rotational speed of the wind turbine, the determined value of the wind speed decreases, starting from a value greater than the second threshold value:
increasing the generator torque, the increasing operation having a response that differs, at least in sections, from a response of the reducing operation.

12. The method of claim 1, wherein said determining of the value of the wind speed includes determining a mean value of the values of the wind speed in a prescribed preset time period.

13. The method of claim 12, wherein the time period is preset so as to be shorter, if the value of the wind speed increases, than if the value of the wind speed decreases.

14. A device for a wind turbine having a rotor, the device comprising:
a controller configured to execute a method, the method including the steps of:
determining a value of a wind speed of an incident air mass at the wind turbine;
if the determined value of the wind speed is greater than a first threshold value for the wind speed:
reducing a rotational speed of the rotor of the wind turbine, and
maintaining or increasing a generator torque acting upon the rotor;
if the determined value of the wind speed is greater than a second threshold value for the wind speed, the second threshold value being greater than the first threshold value:
reducing the rotational speed of the rotor, and
reducing the generator torque acting upon the rotor.

15. The device of claim 14 further comprising:
a non-transitory computer readable storage medium having a program code stored thereon;
said controller including a processor;
said program code being configured, when executed by said processor, to perform said method.

16. A method for operating a wind turbine, the method comprising the steps of:
determining a value of a wind speed of an incident air mass at the wind turbine;
performing the following steps when the determined value of the wind speed is greater than a first threshold value for the wind speed and less than a second threshold value for the wind speed:
reducing a rotational speed of a rotor of the wind turbine, and
maintaining or increasing a generator torque acting upon the rotor; and,
performing the following steps when the determined value of the wind speed is greater than the second threshold value for the wind speed, the second threshold value being greater than the first threshold value:
reducing the rotational speed of the rotor, and
reducing the generator torque acting upon the rotor.

* * * * *